US006392670B1

(12) United States Patent
Takeuchi et al.

(10) Patent No.: US 6,392,670 B1
(45) Date of Patent: *May 21, 2002

(54) DEVICE SETUP SUPPORT SYSTEM AND METHOD AND RECORDING MEDIUM

(75) Inventors: Takeshi Takeuchi; Shinji Tanaka, both of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,445

(22) Filed: May 26, 2000

Related U.S. Application Data

(63) Continuation of application No. 09/126,772, filed on Jul. 31, 1998, now Pat. No. 6,091,413.

(30) Foreign Application Priority Data

Jul. 31, 1997 (JP) .............................................. 9-206853

(51) Int. Cl.[7] ................................................. G09G 5/00
(52) U.S. Cl. ........................ 345/760; 345/712; 345/737; 345/732
(58) Field of Search ................................. 345/705–709, 345/714, 732, 781, 783, 803, 806, 769, 770, 764, 854, 785, 760, 712, 737

(56) References Cited

U.S. PATENT DOCUMENTS

| | | | | |
|---|---|---|---|---|
| 4,964,077 A | | 10/1990 | Eisen et al. .................. 364/900 |
| 5,481,667 A | | 1/1996 | Bieniek et al. .............. 395/161 |
| 5,500,936 A | * | 3/1996 | Allen et al. .................. 395/348 |
| 5,613,150 A | * | 3/1997 | Yamada ....................... 345/712 |
| 5,682,511 A | | 10/1997 | Sposato et al. ................. 348/7 |
| 5,771,043 A | * | 6/1998 | Nigawara et al. ............ 345/419 |
| 5,825,356 A | | 10/1998 | Habib et al. ................. 345/338 |
| 5,943,049 A | | 8/1999 | Matsubara et al. .......... 345/338 |
| 5,959,630 A | | 9/1999 | Takeuchi et al. ............. 345/123 |
| 5,971,763 A | | 10/1999 | Yau ............................... 434/86 |
| 6,002,396 A | | 12/1999 | Davies ......................... 345/339 |
| 6,002,936 A | * | 12/1999 | Roel-Ng et al. ............. 455/456 |
| 6,005,569 A | | 12/1999 | Breggin ....................... 345/338 |
| 6,034,683 A | * | 3/2000 | Mansour et al. ............. 345/339 |
| 6,091,413 A | * | 7/2000 | Takeuchi et al. ............. 345/760 |
| 6,128,013 A | * | 10/2000 | Prabhu et al. ............... 345/707 |
| 6,154,205 A | * | 11/2000 | Carroll et al. ............... 345/327 |

OTHER PUBLICATIONS

"Architecture for a Graphic Software Install Assistant Interface", IBM Technical Disclosure Bulletin, vol. 37, No. 12, Dec. 1994, pp. 311–312.
"A Content–Sensitive Help System Based on Hypertext", Proceedings of the 24th ACM/IEEE Design, Automation Conference, 1987, pp. 429–435.
"Online Scenario–Based Task Help", Jackson et al., IEEE Transactions on Professional Communication, vol. 35, No. 2, Jun. 1992, pp. 91–97.
"Panel Hierarchy for System Definition", IBM Technical Disclosure Bulletin, vol. 34, No. 2, Jul. 1991, pp. 170–173.
"Automatic Generation of Task–Oriented Help", Pangoli et al., UIST '95, Nov. 17, 1995, pp. 181–187.

* cited by examiner

Primary Examiner—Raymond J. Bayerl
Assistant Examiner—Thomas J Joseph
(74) Attorney, Agent, or Firm—Sughrue Mion, PLLC

(57) ABSTRACT

An HTML file corresponding to the current selected step is displayed by a WWW browser as a display screen 160. A link title 168 represents the preceding step; the link titles are linked with the HTML files corresponding to the preceding steps separately. A link title 170 represents the step following the current step; it is linked with an HTML file 174 corresponding to the following step. Thus, the user can select any one only from among all steps corresponding to the link titles 168 and the following step 174 and cannot skip steps following the current step to select any one of the following steps.

20 Claims, 19 Drawing Sheets

DEVICE SETUP SUPPORT SYSTEM AND METHOD AND RECORDING MEDIUM

This is a Continuation of application Ser. No. 09/126,772 now U.S. Pat. No. 6,091,413 filed Jul. 31, 1998, the disclosure of which is incorporated herein by reference.

BACKGROUND OF INVENTION

This invention relates to a device setup support system, etc., for supporting user operation under guidance on an output unit when the user sets up a device in a predetermined state.

Machine operation manuals, initialization manuals, etc., have been supplied as paper media for a long time. However, in recent years, some manuals have been stored on recording media such as CD-ROM as electronic information and supplied to the user. The recording media are read by an electronic machine such as a computer and provide the user with information almost similar to that contained in manuals on the paper media through an output unit such as a display.

Manuals are roughly classified into those for initialization (installation) of a device first executed by the user buying the machine and those concerning how to use the device after the user operates the machine. Cases where manuals for initialization (installation) are electronic manuals are few; if an electronic manual for initialization (installation) exists, it only provides the user with information almost similar to that on paper of paper media from an output unit and does not make the best use of the features of electronic manuals.

Initialization refers to a sequence of setup operation beginning with taking out a device from a package and checking accessories, followed by machine installation location specification, power connection, machine running in, etc., and is an extremely important process affecting user's own safety, but instructions for initialization are only given still as a paper medium.

However, to provide a paper medium for describing the initialization operation, the user often skips some pages for his or her own convenience and sets up the machine in his or her own way.

SUMMARY OF INVENTION

It is therefore an object of the invention to provide a system, etc., for making the user read a setup instruction manual of a device in order for enabling the user to set up the device reliably.

To the end, according to a first aspect of the invention, there is provided a device setup support system for supporting operation of a user under guidance on an output unit when the user sets up a device in a predetermined state, the system comprising: step output sequence setting means for dividing the device setup into steps and setting a list sequence of the steps; guidance data storage means for forming guidance for describing the steps of still images, moving images, voice, etc., having the still images, moving images, voice, etc., as data, and storing the data so that the data can be retrieved corresponding to each of the setup steps; step selection means for referencing the step output sequence and outputting the step immediately following the current step selected and a step allowed according to an allowable condition as the next selectable steps so that the user can select one of the steps; and guidance output means for outputting the guidance data corresponding to the step selected through the step selection means by the user in step units.

According to a second aspect of the invention, there is provided a device setup support method for supporting operation of a user under guidance on an output unit when the user sets up a device in a predetermined state, the method comprising the steps of: dividing the device setup into steps and setting a list sequence of the steps; forming guidance for describing the steps of still images, moving images, voice, etc., having the still images, moving images, voice, etc., as data, and storing the data so that the data can be retrieved corresponding to each of the setup steps; referencing the step output sequence and outputting the step immediately following the current step selected and a step allowed according to an allowable condition as the next selectable steps so that the user can select one of the steps; and outputting the guidance data corresponding to the step selected through the step selection means by the user in step units.

According to a third aspect of the invention, there is provided a computer-readable recording medium storing a program for causing a computer to execute means for supporting operation of a user under guidance on an output unit when the user sets up a device in a predetermined state, comprising: a step output sequence setting function for dividing the device setup into steps and setting a list sequence of the steps; a guidance data storage function for forming guidance for describing the steps of still images, moving images, voice, etc., having the still images, moving images, voice, etc., as data, and storing the data so that the data can be retrieved corresponding to each of the setup steps; a step selection control function for referencing the step output sequence and controlling output of the step immediately following the current step selected and a step allowed according to an allowable condition as the next selectable steps so that the user can select one of the steps; and a guidance output control function for controlling output of the guidance data corresponding to the step selected through the step selection means by the user in step units.

According to a fourth aspect of the invention, the step selection means enables the guidance data to be selected only in the original output sequence set in the step output sequence setting means, so that the user can be made to read all guidance data in the predetermined sequence. Specific guidance data even out of the output sequence can also be selected depending on the allowable condition for user's convenience.

According to a fifth aspect of the invention, the step allowed according to the allowable condition is a step selected once or more in the past. Thus, the user can select a previously output step and again output the step.

According to a sixth aspect of the invention, the step allowed according to the allowable condition is every step preceding the current step selected based on the list sequence set in the step output sequence setting means. Thus, more options can be provided for the user.

According to a seventh aspect of the invention, the guidance is formed of files linked with each other, and the step selection control function describes information linked with the guidance files corresponding to the next selectable steps in the guidance file corresponding to the current step selected. Thus, it is made possible to prepare an electronic manual more easily by a program or a script having a link function.

DETAILED DESCRIPTION OF PREFERRED EMBODIMENTS

Referring now to the accompanying drawings, there are shown preferred embodiments of the invention.
<First embodiment>

Figure 1:
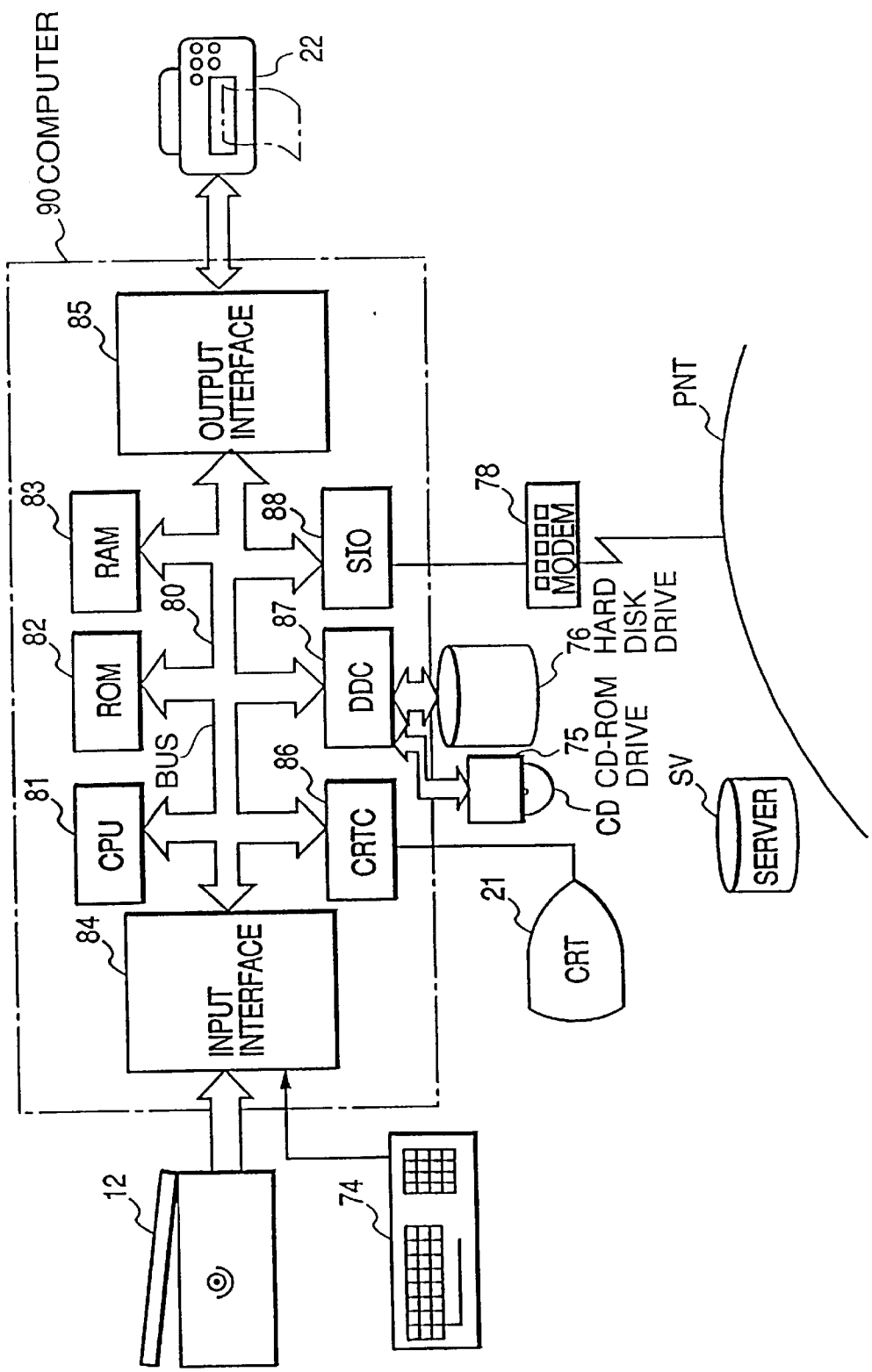
FIG. 1 is a diagram to describe the configuration of a computer, etc., for executing embodiments of the invention.

FIG. 1 is a diagram to describe the configuration of a computer, etc., for executing embodiments of the invention. In the figure, a computer 90 comprises a CPU (central processing unit) 81 for performing operations for controlling the operation concerning an electronic manual according to a program, ROM (read only memory) 82 previously storing programs and data required for the CPU 81 to perform operations, and RAM (random access memory) 83 for temporarily reading and writing programs and data required for the CPU 81 to perform operations, the CPU 81, the ROM 82, and the RAM 83 being connected by a bus 80.

An input interface 84 is provided for inputting signals from a scanner 12 and a keyboard 74 and an output interface 85 is provided for outputting data to a printer 22. A CRTC 86 controls signal output to a CRT 21 capable of color display and a disk controller (DDC) 87 controls data transfer to and from a hard disk drive 76, a CD-ROM drive 75, or a flexible disk drive (not shown). Programs loaded into the RAM 83 for execution, programs supplied in a device format, and the like are stored on hard disk.

In addition, a serial input/output interface (SIO) 88 is connected to the bus 80. On the other hand, the SIO 88 is also connected to the modem 78 for connection to a public switched line PNT. The computer 90 is connected to an external network through the SIO 88 and the modem 78. By connecting the computer 90 to a specific server SV, programs and data required for an electronic manual of the embodiment can be downloaded onto hard disk for execution or can be executed in a continuous connection state.

Therefore, the programs executed in the embodiment can be recorded on CD-ROM or flexible disk as a recording medium. The computer 90 can read the programs through the disk drive 75, etc., thereby realizing provided functions. Of course, a network line typified by the public switched line PNT also enables programs, etc., to be read into the computer 90 and thus can be assumed to be a medium.

Figure 2:
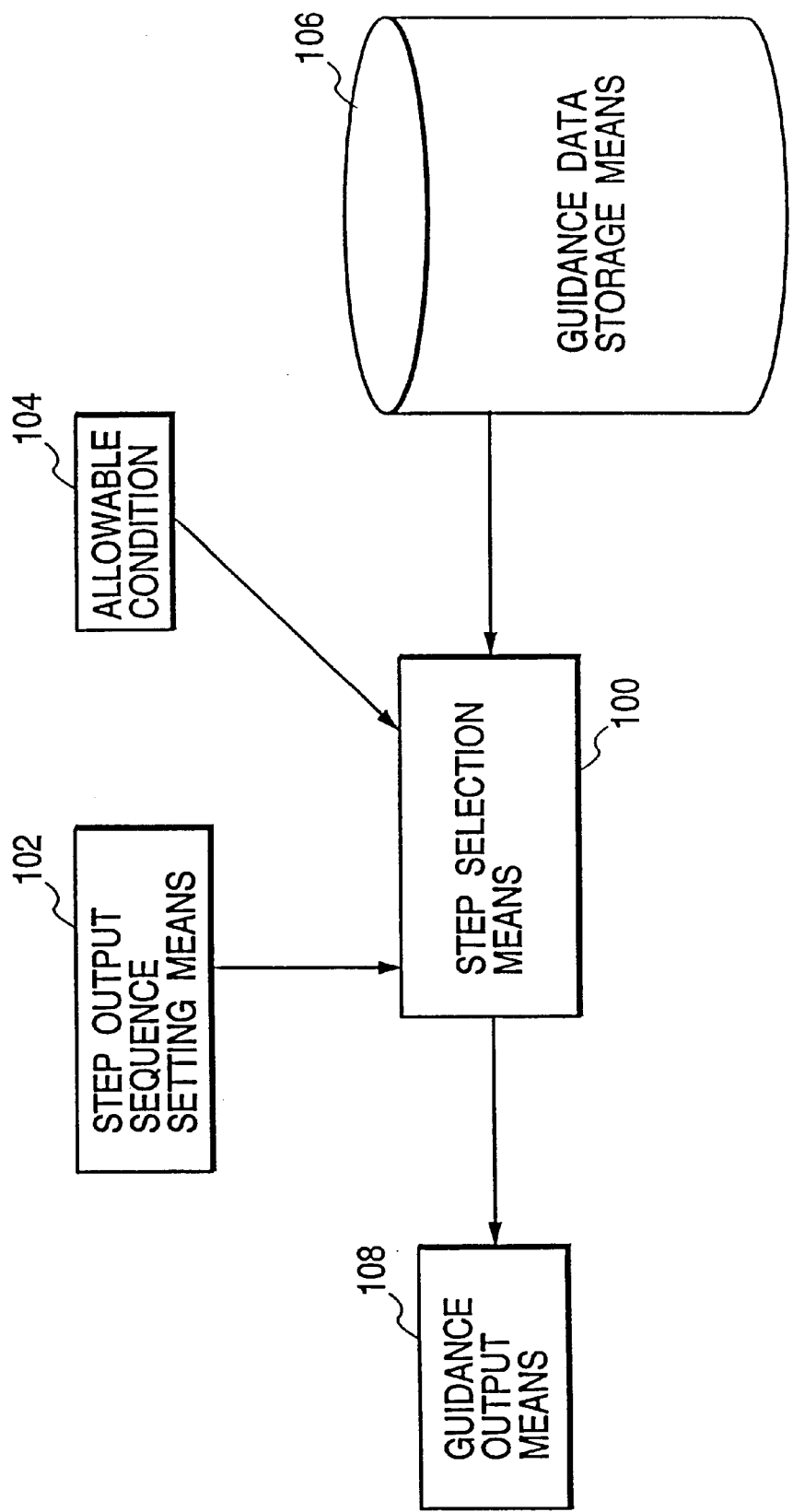
FIG. 2 is a functional block diagram of the invention.

FIG. 2 is a functional block diagram of the embodiment. Guidance data forming an electronic manual comprises still images, moving images, voice data, etc., and is stored on guidance data storage means 106. Electronic manual guidance given to the user is divided into steps and step selection means 100 is provided for selecting another step to output following output of one step. The above-described control program or script is loaded into the RAM 83 in the computer 90 and the step selection means 100 is executed. At this time, the step selection means 100 references information in step output sequence setting means 102 indicating the original output sequence of the electronic manual and an allowable condition 104 indicating output allowable steps other than the output sequence and outputs proper steps through guidance output means 108 in such a manner that the user can select one of the steps.

Figure 3:
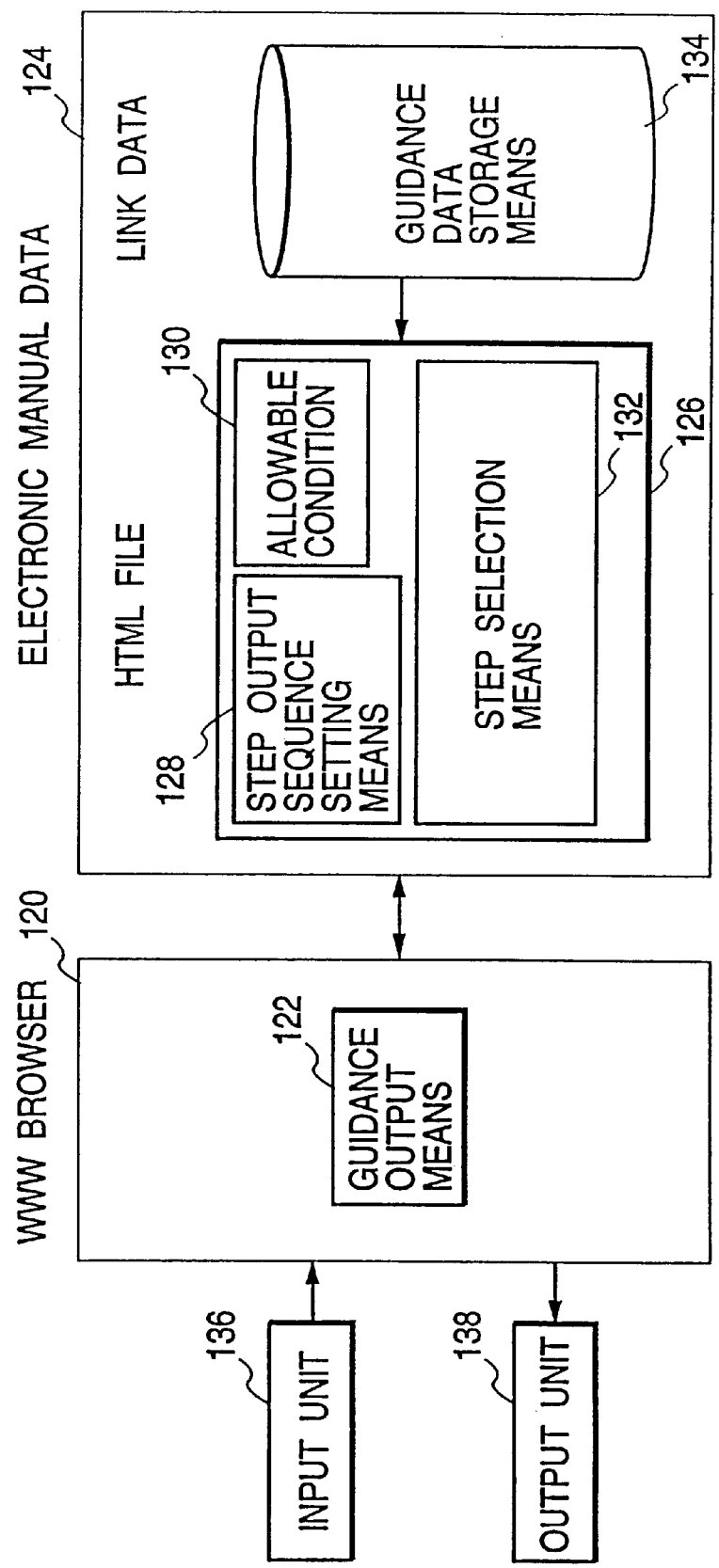
FIG. 3 is a block diagram to describe the functional blocks in FIG. 2 in more detail matched with first embodiment of the invention.

FIG. 3 is a block diagram to describe the functional blocks in FIG. 2 in more detail matched with the embodiment. In the embodiment, an electronic manual is described in a HTML (Hypertext Markup Language) script and is executed by dedicated software walled a WWW browser, such as Netscape Navigator of Netscape Communications or Internet Explorer of Microsoft. The WWW browser is an execution tool developed for reading Internet Web pages, etc., and can operate on various operating systems of personal computer hardware, such as MS-Windows and MS-DOS of Microsoft, Mac-OS of Apple, and UNIX.

In the embodiment, the electronic manual is put into an HTML file operating on the WWW browser instead of a dedicated program with the aim of providing an executable environment without selecting personal computer hardware or an operating system. A large number of books concerning the HTML and WWW browser are published and therefore the topics will not be discussed in detail here. With display in the HTML, not only a part of a text document written in the HTML can be displayed, but also any other file (text data, still image, moving image, etc.,) can be displayed at a predetermined position with a predetermined size.

As a larger feature, a link function for calling another HTML file or any other file is provided. A linked title described in the HTML is underscored, etc., on a display screen for discriminating from unlinked titles. If the user double-clicks on the linked title with a mouse, etc., a file liked with the title can be displayed. If the liked file is image data, the corresponding image is displayed. A return can also be made from the linked file to the root file. In the embodiment, the HTML file link function is used to impose a limit on the next step to be selected.

Figure 10:
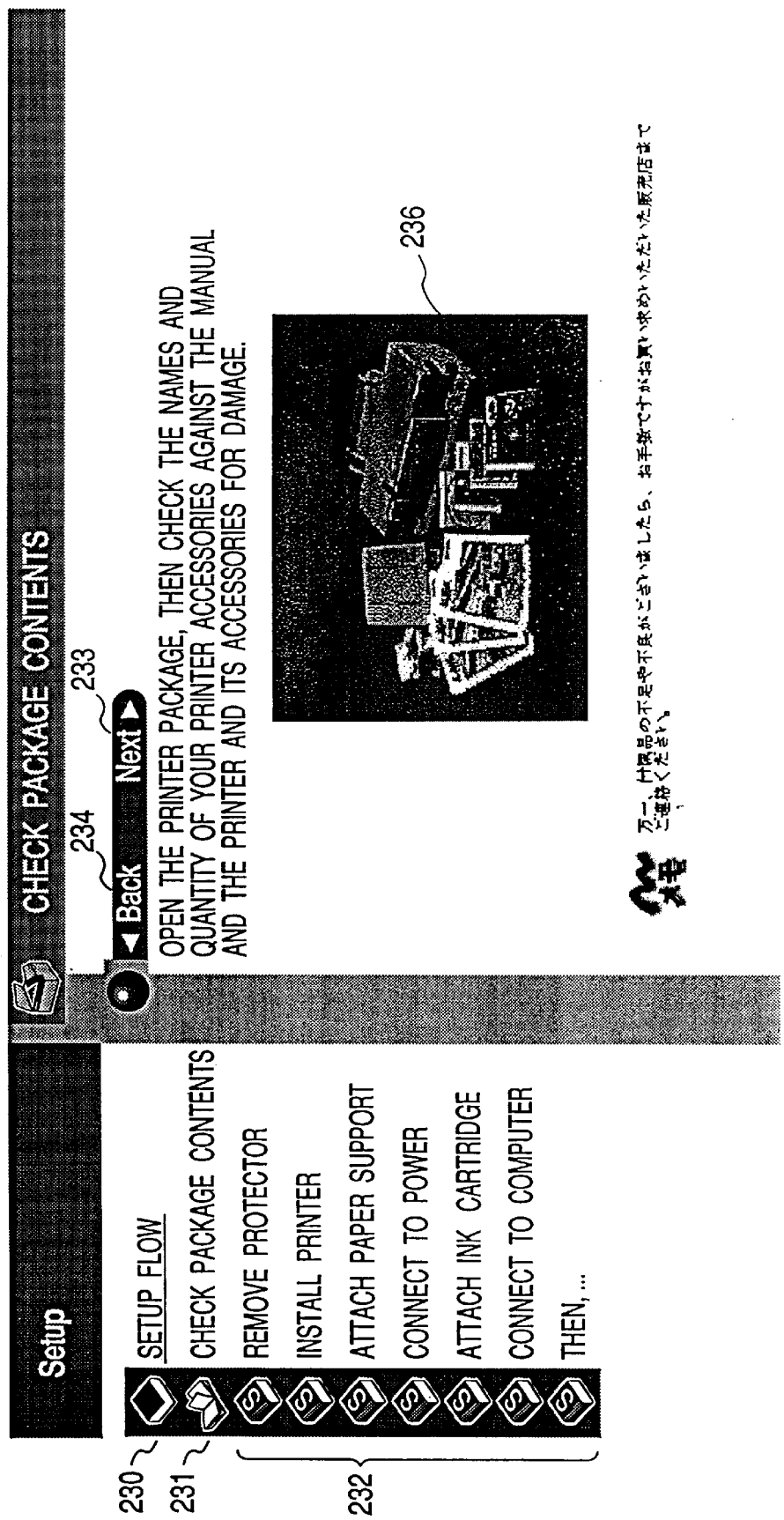
FIG. 10 is a display screen of the first minor step of a major step "Check package contents;"

Actual link description in the HTML is as follows: FIG. 10 is an example of screen display described later. A Next button 233 is formed by image data "STEPNEXT.GIF" and is the linked to HTML file "SUTO*D.HTM." At this time, HTML script is described as <a href="SUTO*D.HTM" target="main"><imgsrc="../IMAGE/STEPNEXT.GIF" ALT" "border="0" width="80" height="27"> href="SUTO*D.HTM" is the linked file specification and imgsrc="../IMAGE/STEPNEXT.GIF" is directory and file name specification of an image file displayed at this position. Such simple description enables link and image display to be embedded in the HTML script.

In FIG. 3, a WWW browser 120 is loaded into the RAM 83 and operates on an operating system of MS-Windows, etc. Guidance output means 122 corresponds to a display function of the WWW browser 120. Electronic manual data normally resides on CD-ROM and not all data or management program is loaded into the RAM 83 or the HDD 76 to prevent unnecessary consumption of the resources of the HDD, etc., because the manual data particularly concerning device setup in the electronic manual data normally is used by the user only once at the device setup time. When the user gives an electronic manual start command, the WWW browser 120 reads an image corresponding to a start screen from an HTML file in the CD-ROM and displays it on an output unit 138 such as a display. The HTML file reads a large number of pieces of image data and link data from guidance data storage means 134 and forms a display screen. That is, it can be thought that the real body of the data displayed is stored on the guidance data storage means 134 and that the HTML file 126 performs output control of the data.

Figure 4:
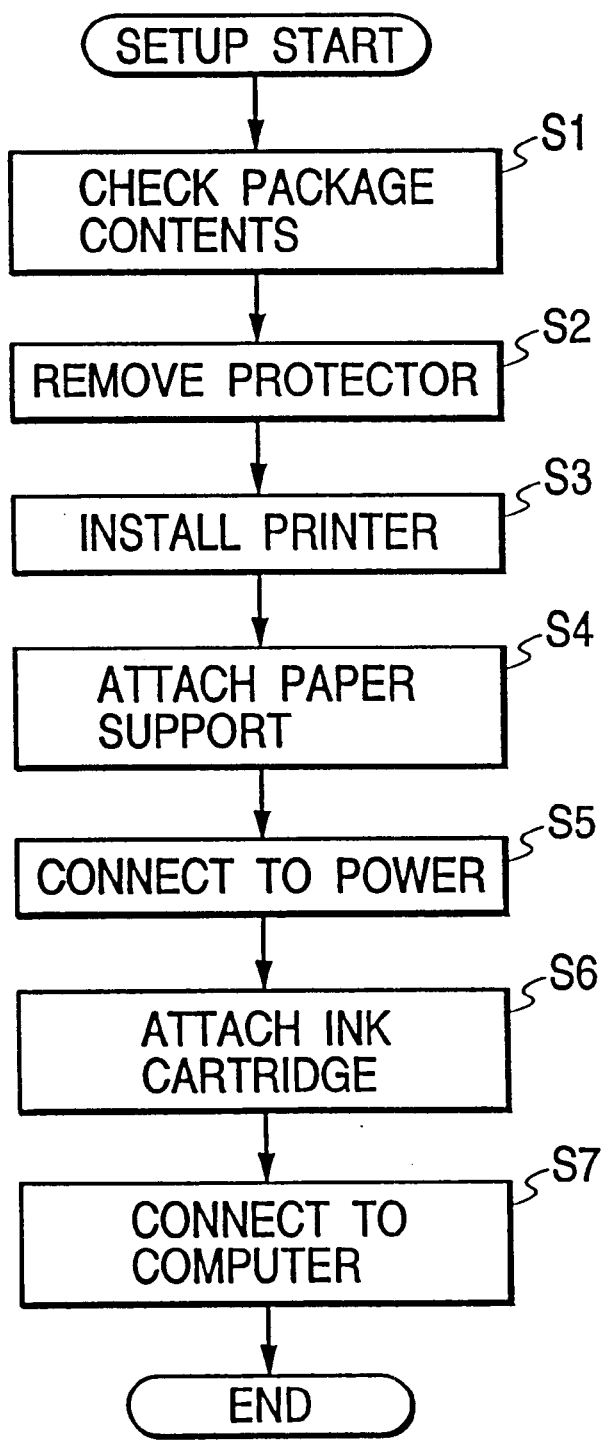
FIG. 4 is a flowchart to show a major setup procedure according to one embodiment of the invention.

Step output sequence setting means 128 sets the original sequence of setup screens displayed at a number of steps. A major setup step flow of the embodiment is shown in FIG. 4. When setup is started, operation and whole steps are described, followed by major steps of "check package contents (S1)," "remove protector (S2)," "install printer (S3)," "attach paper support (S4)," "connect to power (S5)," "attach ink cartridge (S6)," and "connect to computer (S7)" in order. Each major step includes minor steps. A setup manual needs to show setup steps for the user in the determined sequence without omission. Thus, the step output sequence setting means 128 defines an output sequence of major steps and minor steps in the major steps. Further, an allowable condition 130 defines allowable output destinations other than the original output sequence defined in the step output sequence setting means 128. Specifically, the user may select already displayed steps, namely, the steps preceding the current selected step, thus some or all of the preceding steps are made allowable.

Step selection means 132 enables the user to select only steps set in the step output sequence setting means 128 and the allowable condition 130. The guidance output means 122 outputs only link information corresponding to the selectable steps, whereby the user can select link information through an input unit 136 for displaying any desired step. However, other steps, which are not linked, cannot be selected.

Figure 5:
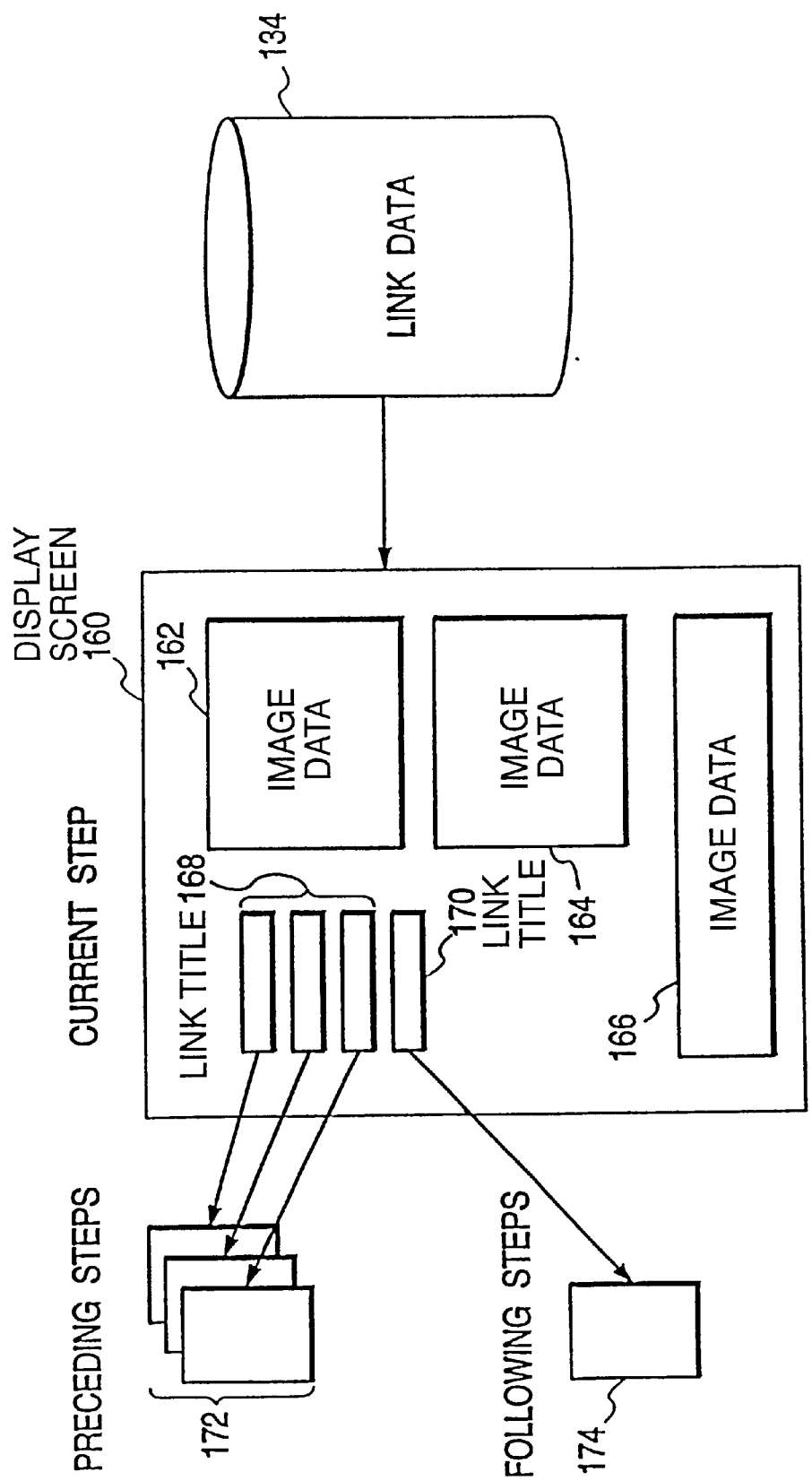
FIG. 5 is an illustration to show how link information is set in HTML files.

FIG. 5 is an illustration to show how link information is set. The HTML file corresponding to the current selected step is displayed by the WWW browser as a display screen 160. Image data pieces 162, 164, and 166 are called from link data 134 stored on the CD-ROM, etc., and are displayed. Numeral 168 is a link title representing the preceding step; the link titles are linked with the HTML files corresponding to the preceding steps separately. Numeral 170 is a link title representing the step following the current step; it is linked with HTML 174 corresponding to the following step. Thus, the user can select any one only from among all steps corresponding to the link titles 168 and the following step 174 and cannot skip steps following the current step to selecct any one of the following steps. Thus, all setup steps can be shown reliably for the user and moreover the preceding steps can be again selected properly by the user for user's convenience.

In FIG. 5, all preceding steps are displayed so that they can be selected, but only some steps like only major steps may be displayed. The purpose of the embodiment is to enable the user to select a step out of the predetermined sequence if the user selected the step in the past and adjust selectable steps considering ease of use, etc.

Figure 9:
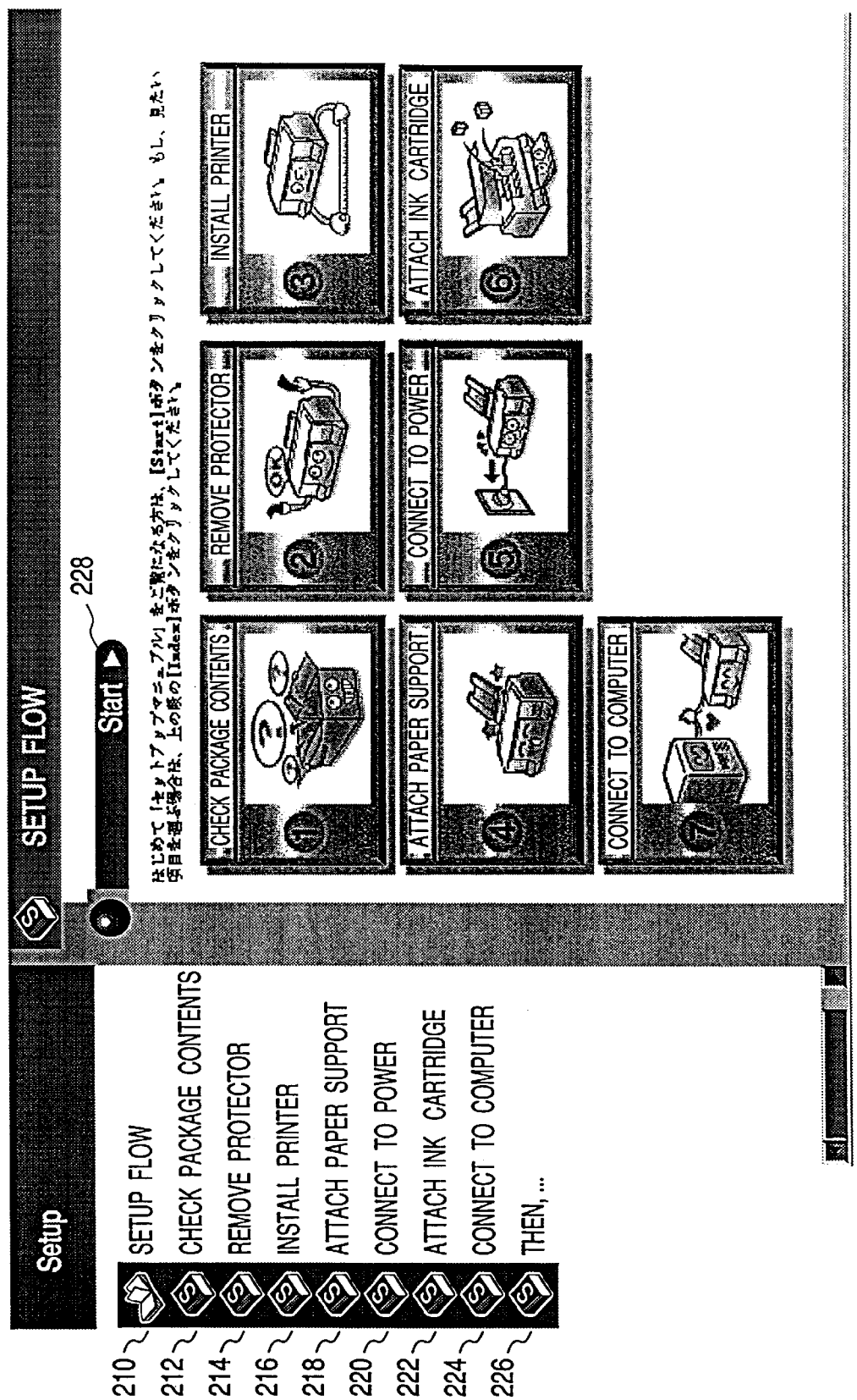
FIG. 9 is a display screen to describe a setup flow.

FIG. 9 to FIG. 19 show display screen examples of the embodiment. FIG. 9 is a screen to describe a setup flow. After the setup manual is started and operation description, etc., is shown, the screen is displayed. Numerals 210 to 226 are titles to select major steps. The title names are as follows: Numeral 210 is "Setup flow," numeral 212 is "Check package contents," numeral 214 is "Remove protector," numeral 216 is "Install printer," numeral 218 is "Attach paper support," numeral 220 is "Connect to power," numeral 222 is "Attach ink cartridge," numeral 224 is "Connect to computer," and numeral 226 is "Then, . . . . ." When only titles are displayed, no link information is set. If the user clicks on one of the titles with a mouse, etc., the step screen corresponding to the title cannot be displayed. If link information is set, its corresponding title is underscored, indicating that the user can select the title. The title 210, "Setup flow," is the current displayed screen. The current major step selected is displayed with a book mark "open." A Start button 228 is linked and when the user selects the button with the mouse, etc., control goes to the next step. The steps with which the Start button and a Next button 233 displayed on the following screens are linked are set in response to the sequence defined in the step output sequence setting means 128. The major steps are illustrated below the Start button 228 for easy understanding.

FIG. 10 is a screen of the first minor step of the major step "Check package contents." When the user double-clicks on the Start button, the screen is displayed. A book mark 231 is opened, the current major step selected is displayed, and a still image 236 shows a printer (product to which the electronic manual is applied) and its accessories. The already selected major step "Setup flow" 230 is underscored, indicating that link information is set. Similar information is also set in a Back button 234. If the user double-clicks on either of the title 230 and the Back button 234, he or she can return to the screen in FIG. 9. Thus, the already selected step meets the allowable condition 103 and can be selected although it is against the sequence set in the step output sequence setting means 128. The title of a major step 232 not yet selected is not underscored and no link information is set. The user can display FIG. 11, the next step, by clinking on the Next button 233.

Figure 11:
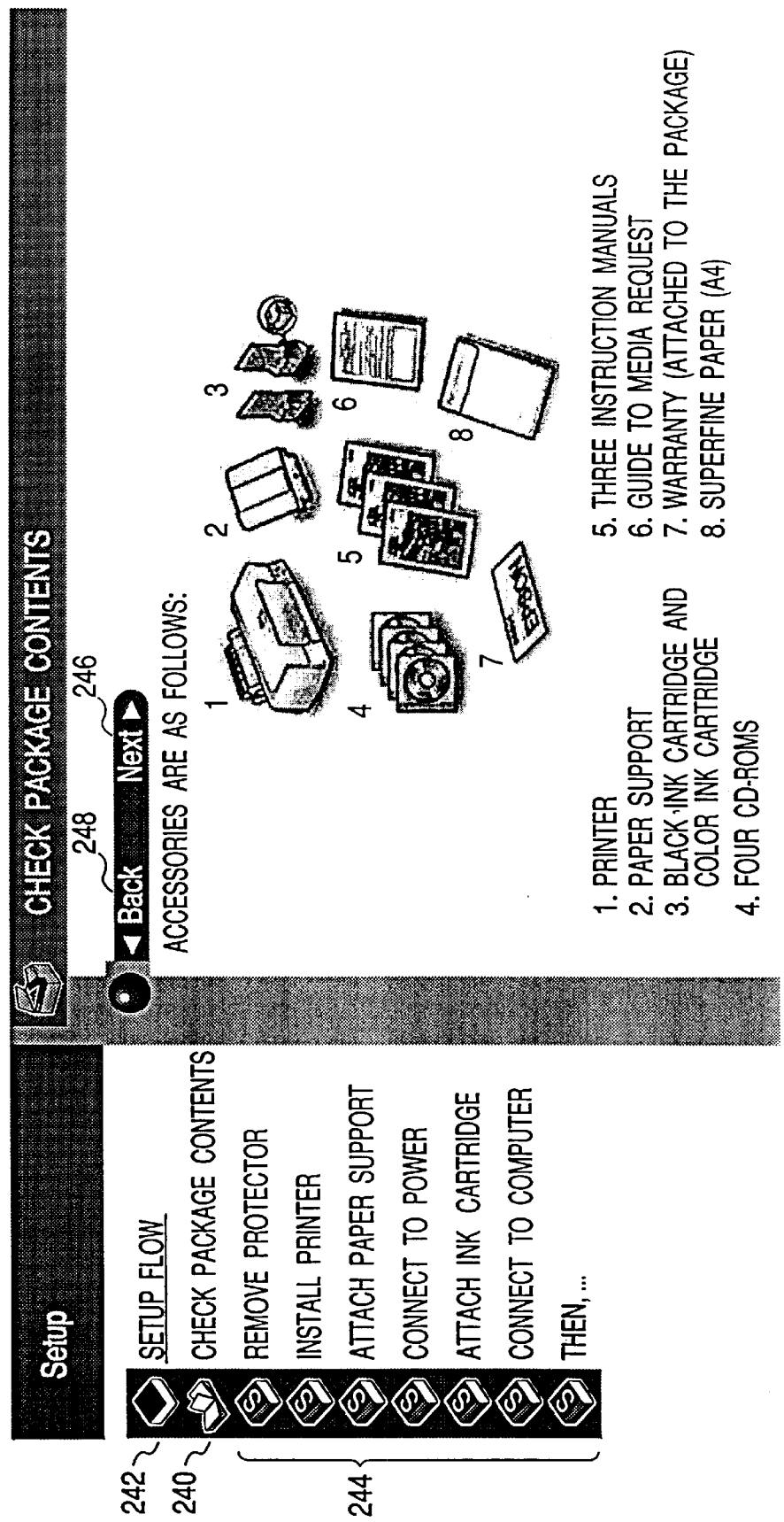
FIG. 11 is a display screen of the second minor step of a major step "Check package contents;"

FIG. 11 is a screen of the second minor step of the major step "Check package contents" for introducing the package contents in more detail. The current step selected, "Check package contents," continues displayed with the book mark open as in numeral 240. If the user clicks on a linked title 242, he or she can return to the preceding major step "Setup flow." If the user clicks on a Back button 248, he or she can return to FIG. 10, the immediately preceding step. Since the major step "Check package contents" comprises two minor steps, if the user selects a Next button 246, control goes to the next major step "Remove protector." It is seen that no link information is set in a major step 244 not yet selected.

Figure 12:
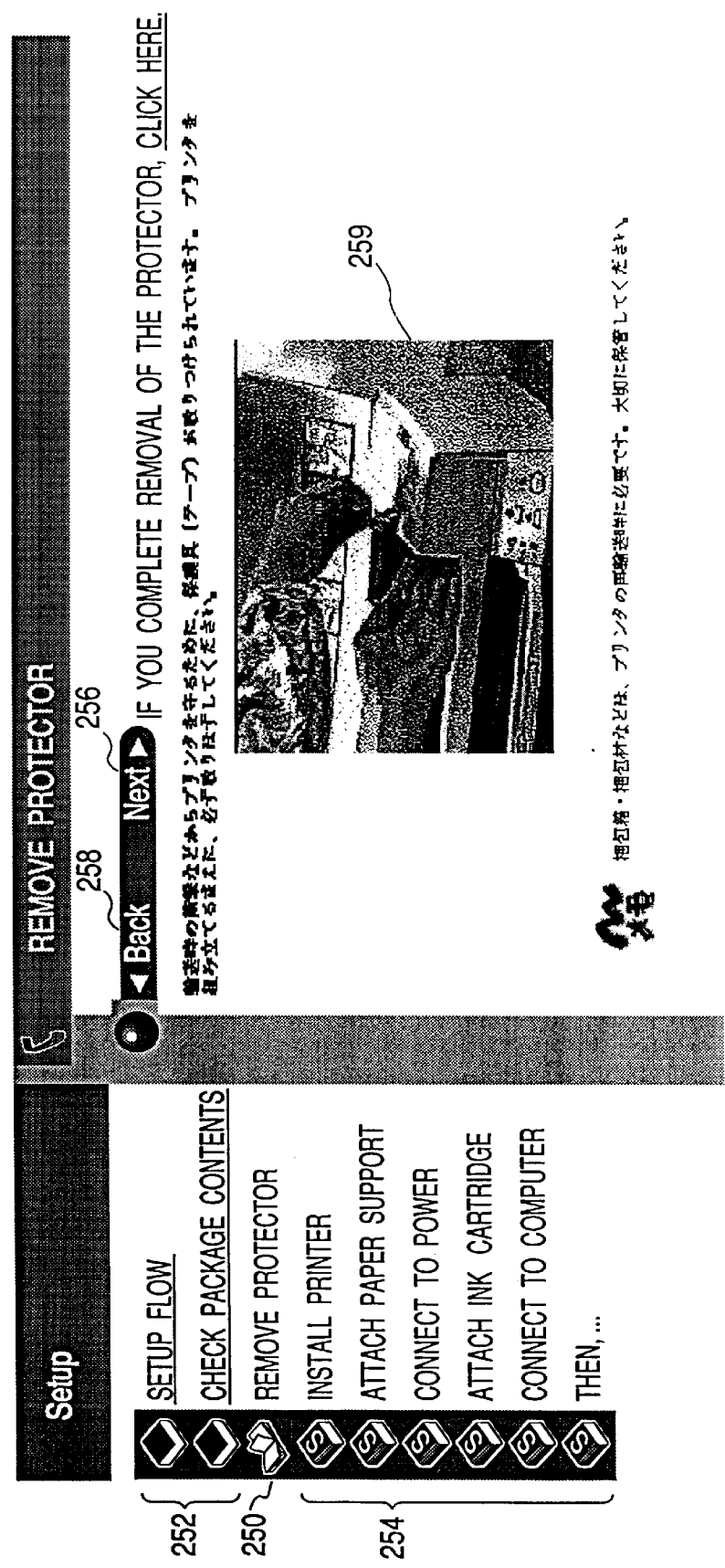
FIG. 12 is a display screen of the first minor step of a major step "Remove protector;"

FIG. 12 is a screen of the first minor step of the major step "Remove protector" and a book mark corresponding to the major step is open as in numeral 250. Numeral 252 indicates the titles of major steps already selected. Link information is set. If the user selects one of the titles, he or she can jump to the first step of the selected title. It is seen that no link information is set in a major step 254 not yet selected. On the screen, how to remove the protector is described in an extremely easy manner with a moving image 259 and by voice. Since the major step "Remove protector" consists of two minor steps, if the user clicks on a Next button 256, he or she goes to the second minor step. If the user further double-clicks on the Next button, he or she can select the next major step "Install printer." If the user clicks on a Back button 258, he or she can return to the screen in FIG. 11.

Figure 13:
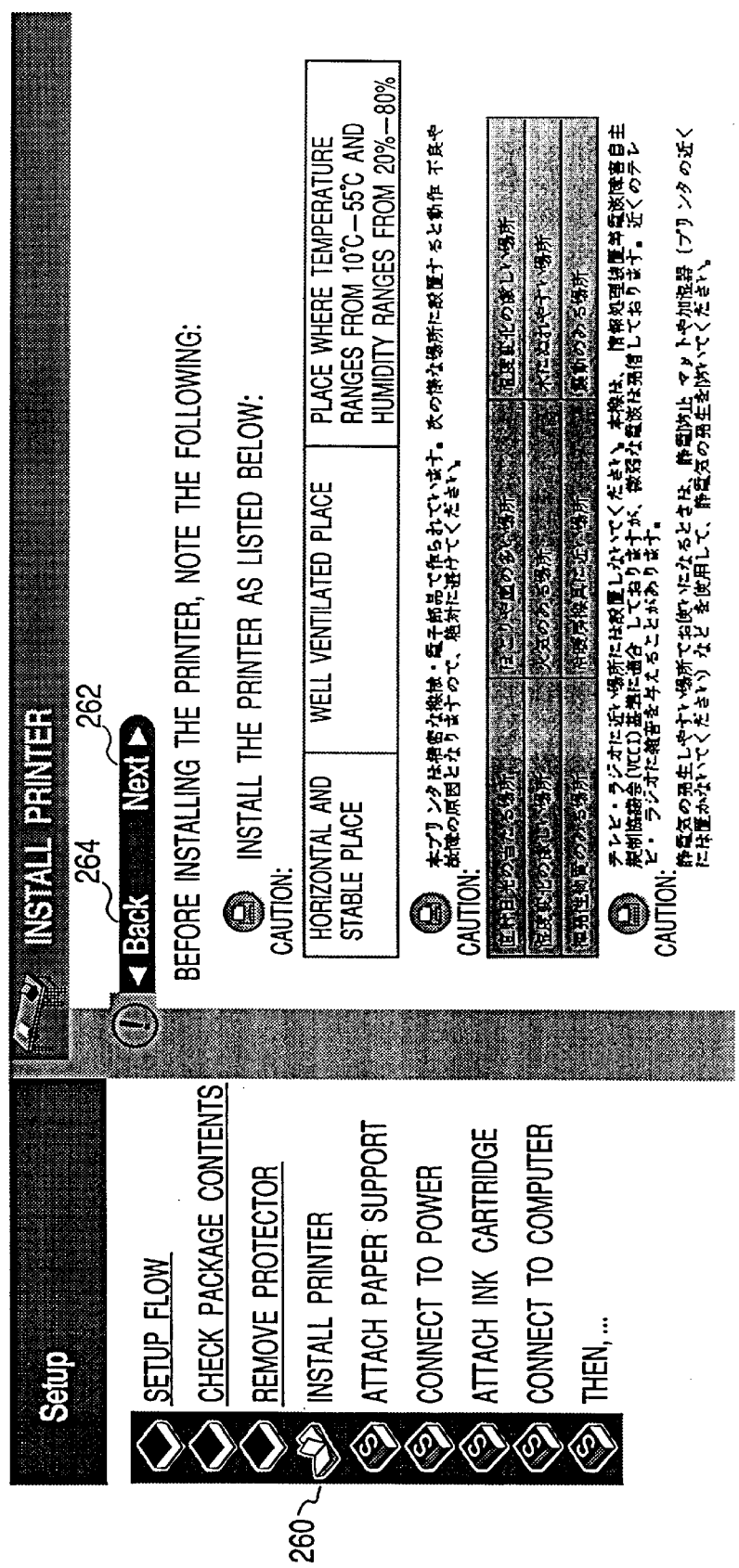
FIG. 13 is a display screen of the first minor step of a major step "Install printer;"

FIG. 13 is a screen corresponding to the first minor step of the major step "Install printer." The current major step is indicated with a book mark 260 open. The already selected steps, which are underscored, can be selected and unselected steps, which are not underscored, cannot be selected. The user can select the next minor step by clicking on a Next button 262 and can return to the screen in FIG. 12 by clicking on a Back button 264. The major step "Install printer" is made up of three minor steps and if the user selects a Next button 262 at the third minor step, a screen shown in FIG. 14 is displayed.

Figure 14:
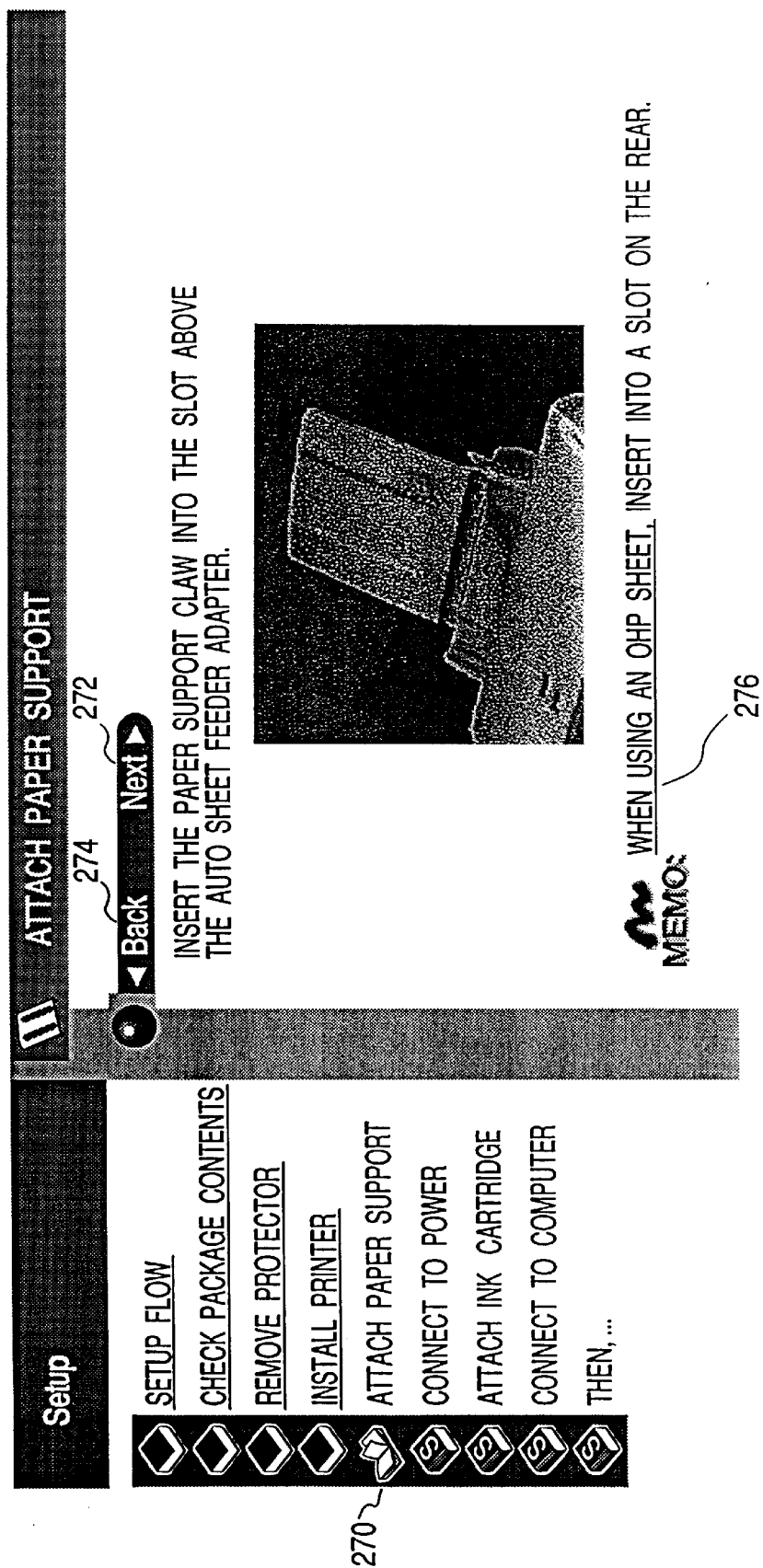
FIG. 14 is a display screen of a major step "Attach paper support;"

FIG. 14 is a screen of the major step "Attach paper support." The current major step selected is displayed with a book mark in numeral 270. Since the major step "Attach paper support" includes only one minor step, the user can move to the next major step by clicking on a Next button 272 and can return to the preceding major step by clicking on a Back button 274. Link 276 corresponds to memo field "When using an OHP sheet, insert into a slot on the rear." on the screen. The expression "When using an OHP sheet," is underscored, indicating that link information is set. If the user double-clicks on the link, a screen to give information required "When using an OHP sheet," appears and can provide the user with necessary information.

Figure 15:
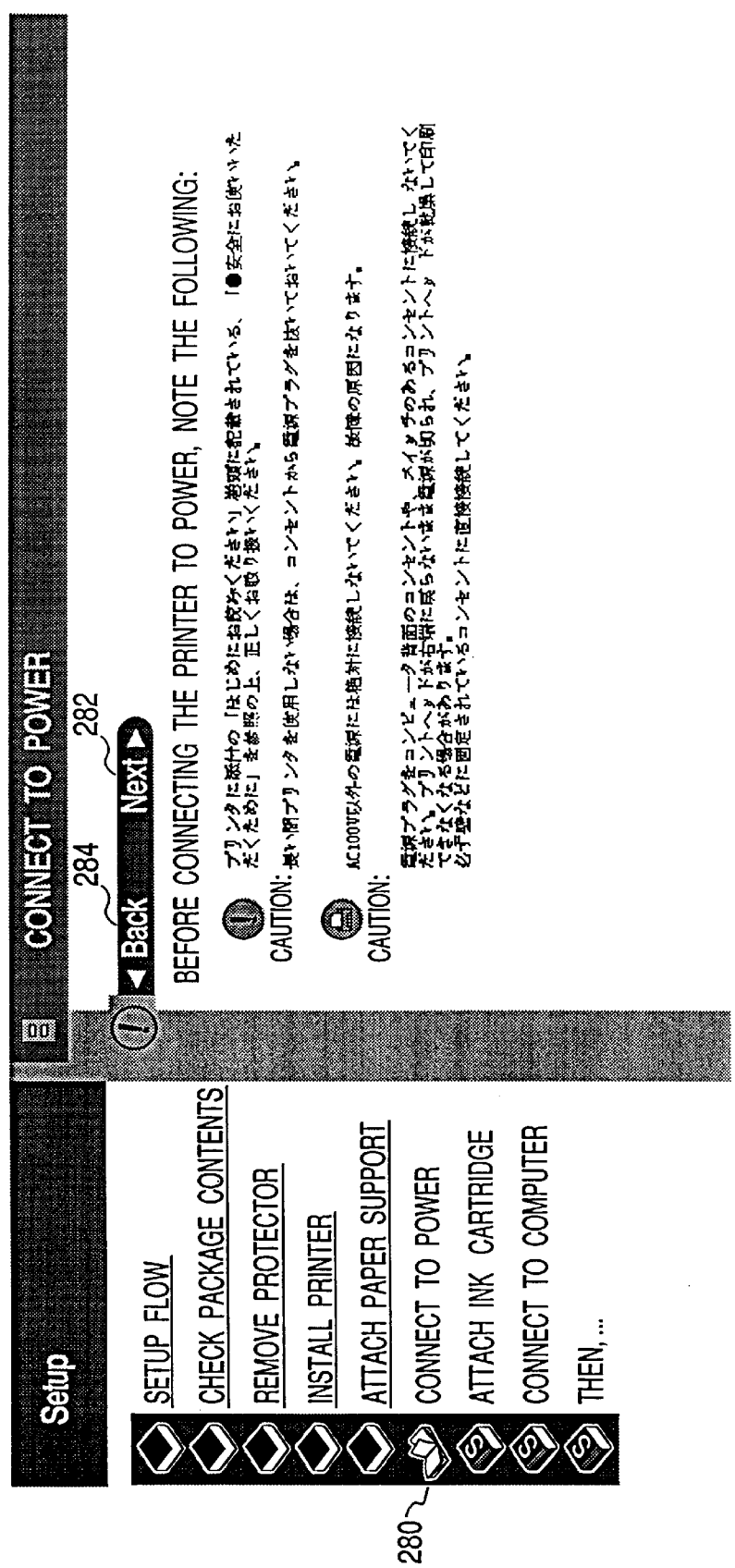
FIG. 15 is a display screen of the first minor step of a major step "Connect to power;"

FIG. 15 is a screen of the first minor step of the major step "Connect to power." The title of the current major step selected is displayed with a book mark open in numeral 280. The user moves to the next minor step by clicking on a Next button 282 and can return to the preceding major step by clicking on a Back button 284. The major step "Connect to power" is made up of three minor steps.

Figure 16:
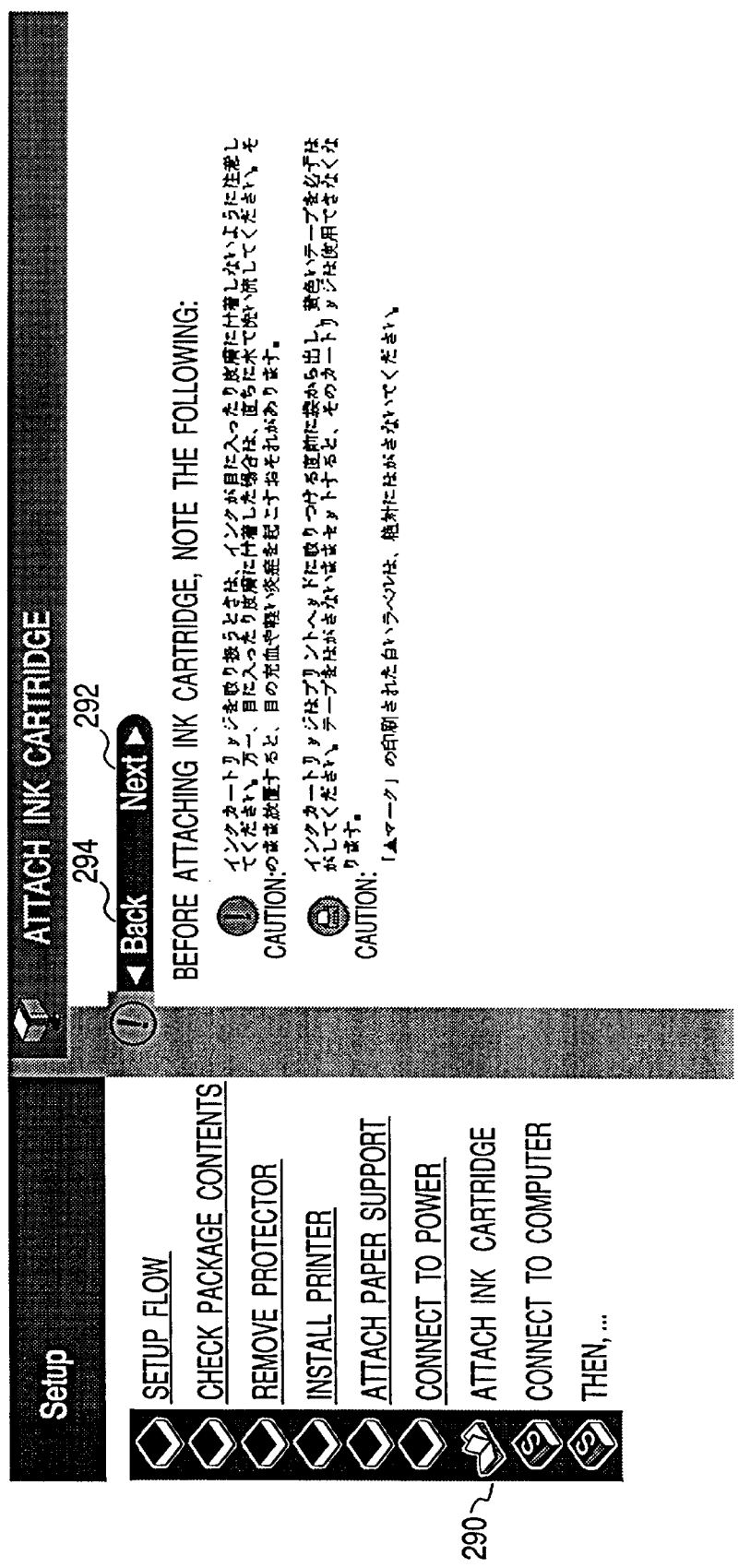
FIG. 16 is a display screen of the first minor step of a major step "Attach ink cartridge;"

FIG. 16 is a screen of the first minor step of the major step "Attach ink cartridge" following "Connect to power." Like other screens, the screen displays the title of the current major step selected with a book mark open in numeral 290. The user can select the next minor step by double-clicking on a Next button 292, or return to the proceeding major step via Back button 294. "Attach ink cartridge" is a step at which it is considered that the user is most confused in operation; it is described in detail at eight minor steps.

Figure 17:
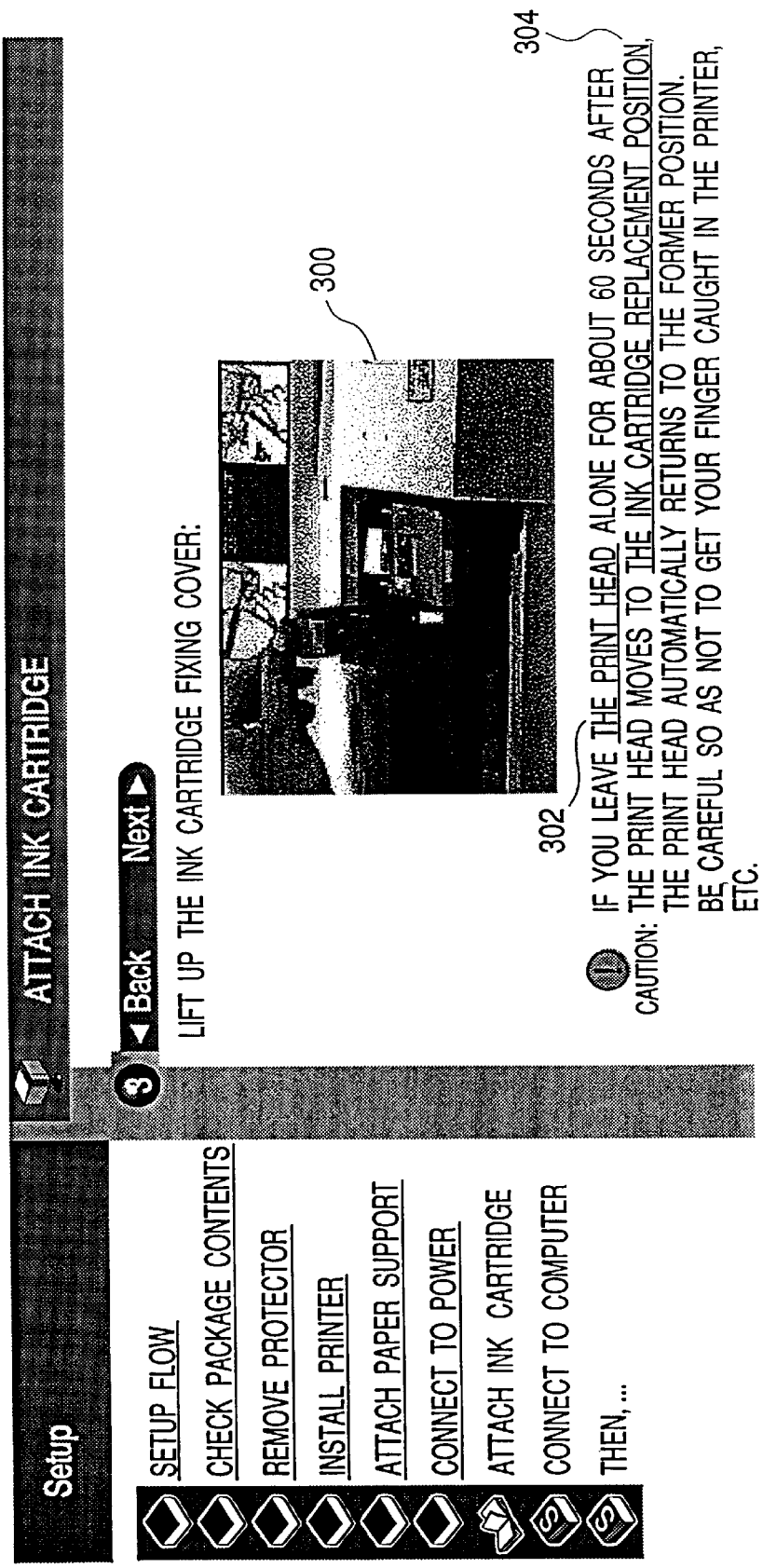
FIG. 17 is a display screen of the fourth minor step of the major step "Attach ink cartridge;"

FIG. 17 is a screen of the fourth minor step of the major step "Attach ink cartridge." A moving image 300 shows attachment of an ink cartridge in an extremely easily understandable manner by actual photo. A caution field is displayed below the moving image and links 302 and 304 are put on keywords in the sentence. The user can select the keyword to display an explanatory screen corresponding to the keyword. Thus, the electronic manual can be easily used by the beginner who does not know the keywords.

Figure 18:
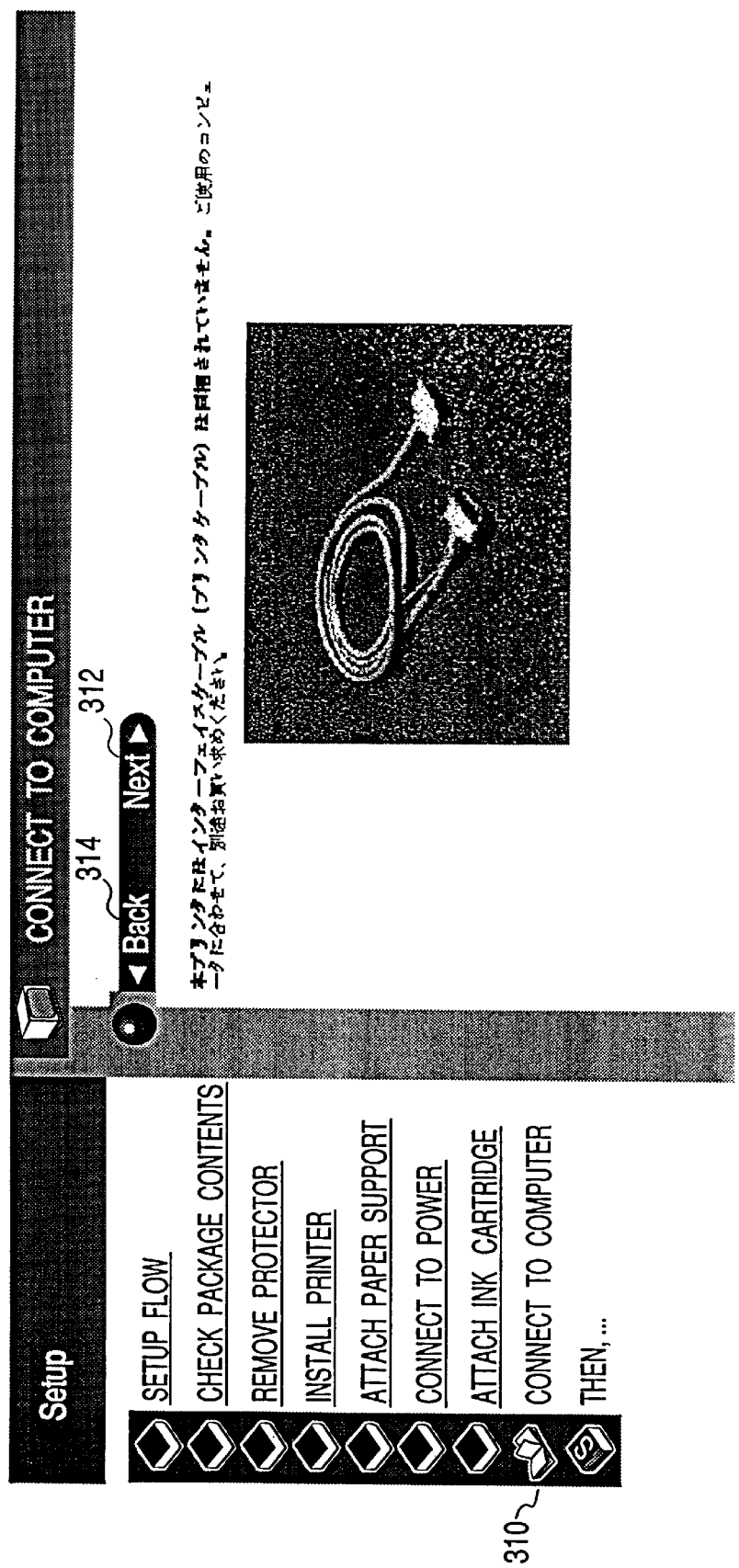
FIG. 18 is a display screen of the first minor step of a major step "Connect to computer.

FIG. 18 is a screen of the first minor step of the major step "Connect to computer" following "Attach ink cartridge." The title of the current major step selected is displayed with a book mark in numeral 310. The preceding titles, which are underscored, can be selected and the following title, which is not underscored, cannot be selected. The user goes to the next minor step by clicking on a Next button 312 and returns to the preceding major step by clicking on a Back button 314. The major step "Connect to computer" consists of five minor steps.

Figure 19:
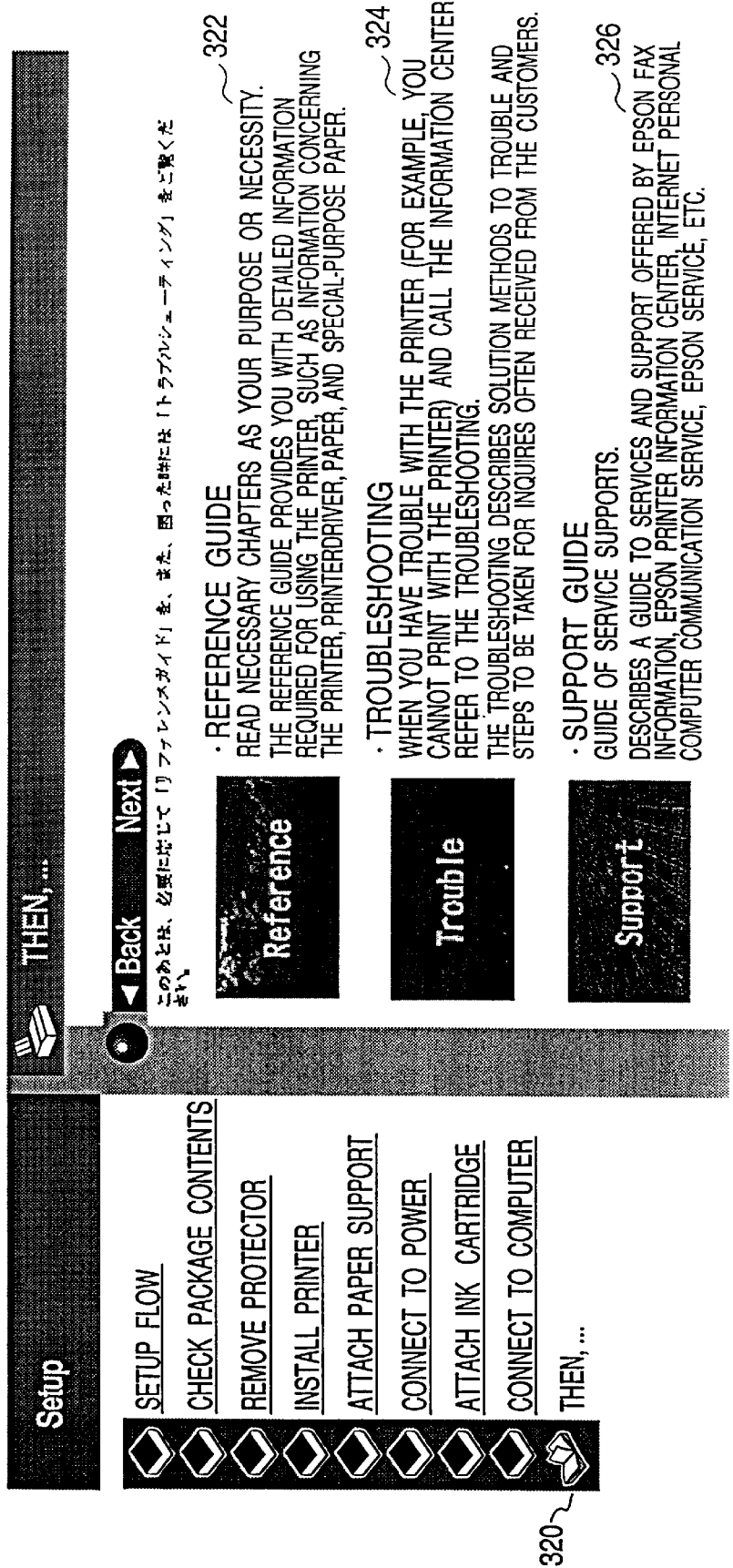
" and FIG. 19 is a display screen of the last minor step of a major step "Then."

FIG. 19 is a screen of the last minor step of the last major step "Then," which is made up of two steps. The current major step selected is displayed in numeral 320 and the fact that all the preceding steps can be selected is indicated by underscoring the titles of the steps. At this point in time, the user can select any desired major step title.

Since the setup is complete on the screen, the subsequent operation method is displayed on guidance 322, 324, and 326. The "reference guide" 322 is a manual concerning how to handle the printer after setup and provides the user with necessary information by contents or keyword search. The "troubleshooting" 324 describes solutions to trouble and steps to be taken for inquires often received from the users. The "support guide" 326 describes a guide to services and support offered by the manufacturer of the printer. The guidance information is installed on the HDD 76 in the computer 90 at the same time as the setup operation is executed, and is registered in the operating system, etc., so that the user can easily call the information later.

The setup operation is now complete. The user can recognize all necessary information for setting up the printer and complete the setup of the printer normally and safely.

Figure 8:
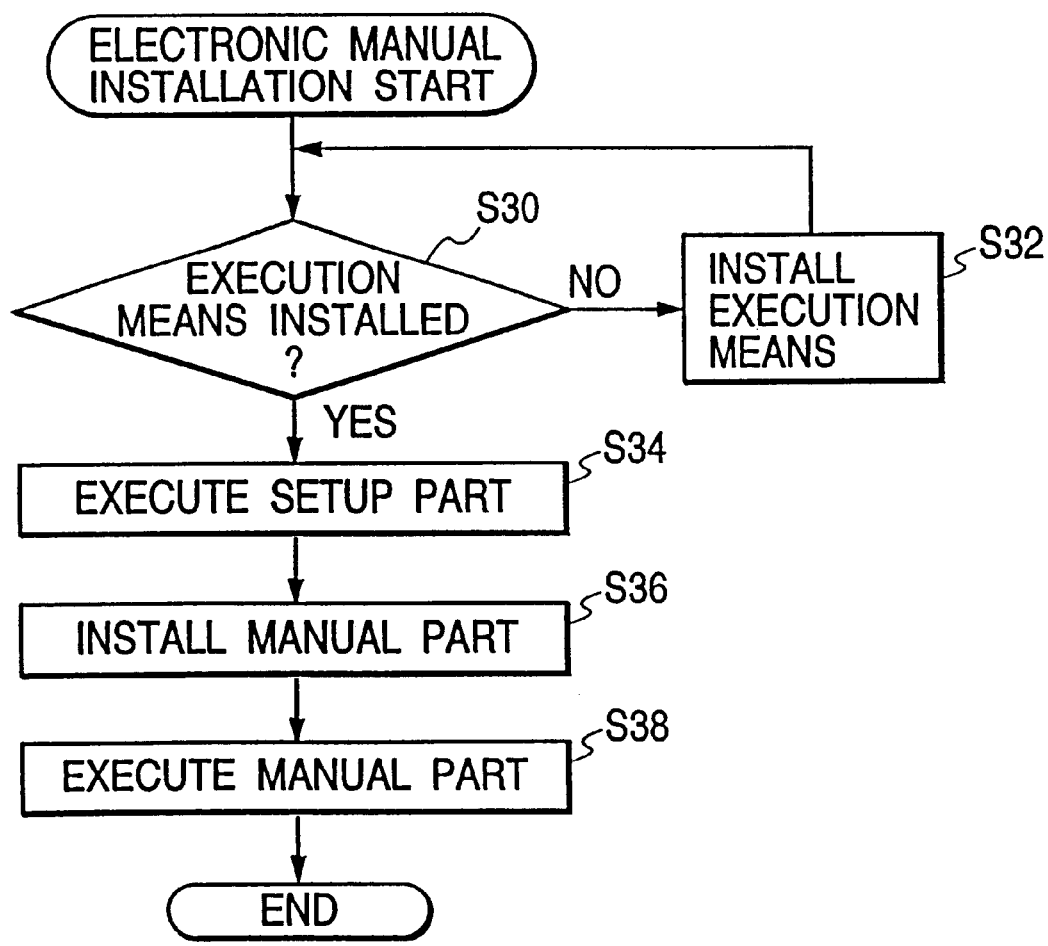
FIG. 8 is a flowchart to show an installation flow of a whole electronic manual.

By the way, the electronic manual of the embodiment is divided into a setup part and a manual part. The setup part describes the printer setup operation as described above. The manual part describes the printer operation after setup. The "reference guide," "troubleshooting," and "support guide" are also contained in the manual part. Installation of the electronic manual will be discussed with reference to a flowchart of FIG. 8.

When the user sets CD-ROM, etc., of the electronic manual in the computer, an auto start program automatically starts installation of the electronic manual. Since the electronic manual is executed on a WWW browser, whether or not a WWW browser of electronic manual execution means is installed in the computer is determined at step S30. If a WWW browser is not installed, WWW browser software provided in the CD-ROM of the electronic manual is installed at step S32 and step S30 is again executed. If it is determined that electronic manual execution means is installed, the setup part is executed at step S34. At this time, necessary contents of the setup part are only loaded into the RAM 83 and are not installed on the HDD, because setup often needs to be executed only once at the beginning, and it is not preferred that setup data consumes the HDD resources.

Upon completion of execution of the setup part, installation of the manual part is started at step S36. Specifically, the screen in FIG. 19 is displayed, then whether or not installation of the manual part is required is inquired of the user. If installation of the manual part is required, it is started. The manual part contains information close to a manual generally supplied as a paper medium and is referenced frequently by the user after completion of the setup, thus is installed on the HDD 76. Since the manual part is also executed on a WWW browser, it can be executed on any personal computer hardware or under any operating system if it is in a WWW browser operation environment.

After the electronic manual installation, the first portion of the manual part is executed and a brief description of the manual part is given to the user at step S38 and the installation is complete. Thus, the setup part rarely used is executed from the CD-ROM and the manual part frequently used is executed from the HDD, so that the HDD resources can be saved while ease of use is enhanced.

<Second embodiment>

In the first embodiment, the setup manual is executed on the WWW browser and the step selection means is provided by the HTML link function. In a second embodiment of the invention, to execute a setup manual by a dedicated program, step selection means is provided by another mechanism. In the second embodiment, the hardware configuration in FIG. 1 and the functional block diagram in FIG. 2 in the first embodiment are applied and a function in FIG. 6 and an execution method in FIG. 7 are provided in place of FIG. 3 and FIG. 5.

Figure 6:
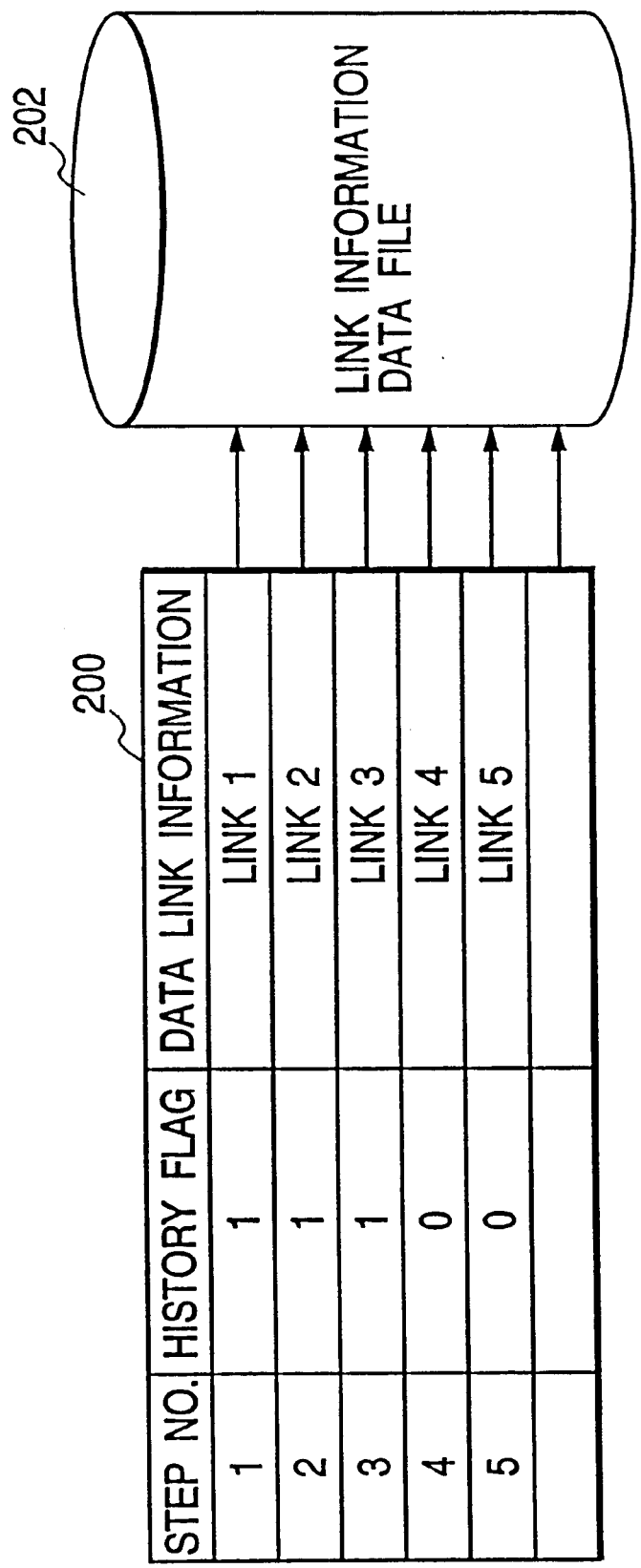
FIG. 6 is a chart to show a function for realizing an allowable condition in a second embodiment of the invention.

FIG. 6 is a chart to show a function for realizing an allowable condition 104 in the second embodiment. In a table 200, step numbers are assigned to all the major and minor steps in the first embodiment and a history flag and data link information are set for each setup number. The history flag is set to "1" if the corresponding the history flag is output. Display programs corresponding to the steps read necessary still images, moving images, and voice data from a link information data file 202 in response to data link information and create screens corresponding to FIG. 9 to FIG. 19, etc. The function of step output sequence setting means 102 is provided by an output sequence table (not shown) setting step numbers and a step output sequence. The step output sequence is determined, namely, a selectable step following the current step is determined according to the table. Since the history flag of an already output set is set to "1," the step with the history flag "1" is allowed as a selectable step.

Figure 7:
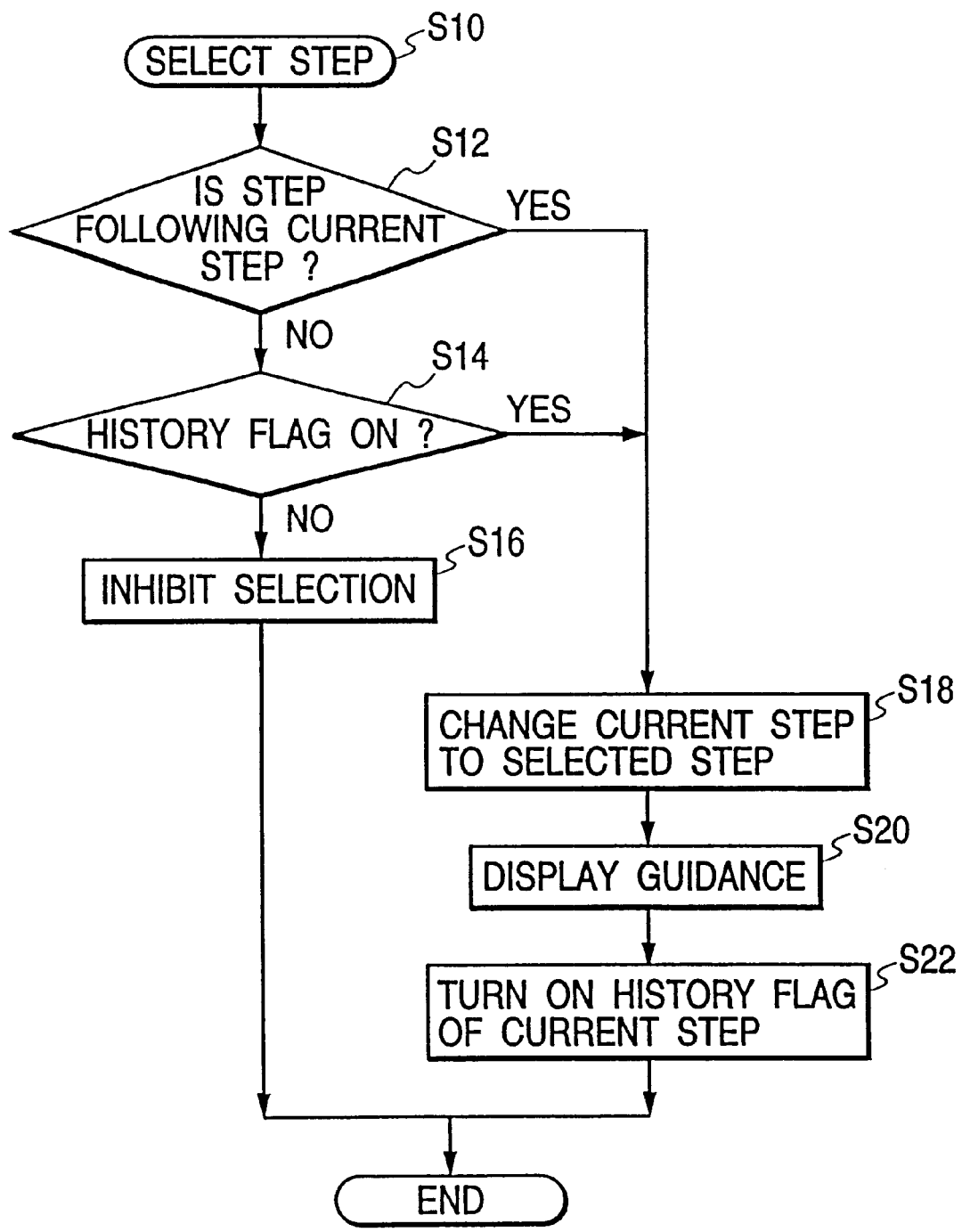
FIG. 7 is a flowchart to show an operation flow of step selection means in the second embodiment of the invention.

FIG. 7 is a flowchart to show an operation flow of step selection means in the second embodiment. If the user selects another desired step at step S10 with one step displayed, the selected step is looked up in the output sequence table to determine whether or not the step is a step following the current step. If the step is a step following the current step, control goes to step S18. If the step is not a step following the current step, control goes to step S14 at which a check is made to see if the history flag of the step is ON ("1"). If the history flag is ON, it is determined that the step was already output once or more, and control goes to step S18. If the output sequence does not match the original output sequence and the history flag of the step is not ON either, control goes to step S16 at which selection of the step is inhibited, the current step continues displayed, and a message to the effect that the step that the user attempts to select cannot be selected is output.

At step S18, the current selected step is changed to the user-selected step. At step S20, guidance including a still image, a moving image, voice data, etc., corresponding to the user-selected step is displayed. At step S22, the history flag of the current flag is turned ON. Thus, the new selected step is set as the step allowed according to the allowable condition. The step selection means and the allowable condition of the invention can be formed not only by the link function in the first embodiment, but also by the function in the second embodiment.

The first and second embodiments of the invention have been discussed. Of course, the invention is not limited to the embodiments. As the medium for supplying the electronic manual, CD-ROM is taken as an example, but media capable of recording data, such as magnetic disk of flexible disk, etc., magnetic tape of DAT tape, etc., optical disk of DVD, etc., IC cards, ROM installed in a machine, can all be applied to the invention. A network line over which data is downloaded can also be assumed to be a medium.

The electronic manuals of the embodiments are applied to printers, but can be applied to manuals of all machines, needless to say. Further, the electronic manuals are executed on the computers, but can be executed on all electronic machines such as copiers, facsimiles, and televisions if the hardware has a CPU, RAM, an output unit, a recording medium reader.

Further, as the language system having the link function, the HTML is taken as an example, but it can also be represented in JAVA, VRML, etc., having more extended functions or any other language, needless to say.

What is claimed is:

1. A device setup support system for supporting operation of a user under guidance from an output unit when the user sets up a device in a predetermined state, said system comprising:

step output sequence setting means for dividing the device setup into steps and setting a list of a sequence of the steps;

guidance data storage means for forming guidance for describing the steps, the guidance comprising at least images having at least image data, and storing the data so that the data can be retrieved corresponding to each of the setup steps;

step selection means for referencing the step output sequence and outputting a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed; and guidance output means for outputting the guidance data corresponding to the step selected through said step selection means by the user in step units wherein the guidance is formed of files linked with each other, and wherein said step selection means describes information linked with the guidance files corresponding to the next selectable steps in the guidance file corresponding to the current step selected.

2. The device setup support system as claimed in claim 1, wherein the step which is allowed according to the allowable condition is every step preceding the current step selected based on the list sequence set in said step output sequence setting means.

3. A system according to claim 1, wherein said selection means comprises a memory map storing history information for a particular step that indicates whether said particular step has been reviewed.

4. A system according to claim 3, wherein said memory map includes a history entry for each step, and a link entry for each step, said link entry for each step including HTML link information for retrieving information pertaining to said each step.

5. A device setup support method for supporting operation of a user under guidance from an output unit when the user sets up a device in a predetermined state, said method comprising the steps of:

dividing the device setup into steps and setting a list sequence of the steps;

forming guidance for describing the steps, the guidance comprising at least images having at least image data and storing the data so that the data can be retrieved corresponding to each of the setup steps;

referencing the step output sequence and outputting a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed; and outputting the guidance data corresponding to the step selected through said step selection by the user in step units, wherein the guidance data is formed of files linked with each other.

6. A computer-readable recording medium storing a program for causing a computer to execute means for supporting operation of a user under guidance from an output unit when the user sets up a device in a predetermined state, comprising:

a step output sequence setting function for dividing the device setup into steps and setting a list sequence of the steps;

a guidance data storage function for forming guidance for describing the steps, the guidance comprising at least images having at least image data, and storing the data so that the data can be retrieved corresponding to each of the setup steps;

a step selection control function for referencing the step output sequence and controlling output of a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed; and a guidance output control function for controlling output of the guidance data corresponding to the step selected through said step selection means by the user in step units, wherein the guidance is formed of files linked with each other, and wherein said step selection control function describes information linked with the guidance files corresponding to the next selectable steps in the guidance file corresponding to the current step selected.

7. The recording medium as claimed in claim 6, wherein the step which is allowed according to the allowable condition is every step preceding the current step selected based on the list sequence set in said step output sequence setting means.

8. A recording medium according to claim 6, wherein said program references a memory map storing history information for a particular step that indicates whether said particular step has been reviewed.

9. A recording medium according to claim 8, wherein said memory map includes a history entry for each step, and a link entry for each step, said link entry for each step including HTML link information for retrieving information pertaining to said each step.

10. A device setup support system for supporting operation of a user under guidance from an output unit when the user sets up a device in a predetermined state, said system comprising:

step output sequence setting means for dividing the device setup into steps and setting a list of a sequence of the steps;

guidance data storage means for forming guidance for describing the steps, the guidance comprising at least images having at least image data, and storing the data so that the data can be retrieved corresponding to each of the setup steps;

step selection means for referencing the step output sequence and outputting a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed, said selection means comprising a memory map storing history information for a particular step that indicates whether said particular step has been reviewed; and guidance output means for outputting the guidance data corresponding to the step selected through said step selection means by the user in step units.

11. A device setup support system for supporting operation of a user under guidance from an output unit when the user sets up a device in a predetermined state, said system comprising:

step output circuitry programmed to divide the device setup into steps and determine a sequence of the steps;

data storage device which stores image data so that the data can be retrieved corresponding to each of the setup steps;

step selection circuitry which is programmed to reference the step output sequence and output a step immediately following the current step selected and a step which is allowed according to an allowable condition as the next selectable steps so that the user can select one of the steps, said allowed steps being limited to certain previously selected steps to ensure that the user views a step which is immediately following the current step or a step which the user has previously viewed; and guidance output device which for outputs the guidance data corresponding to the step selected through said step selection means by the user in step units wherein the guidance is formed of files linked with each other, and wherein said step selection circuitry is programmed to describe information linked with the guidance files corresponding to the next selectable steps in the guidance file corresponding to the current step selected.

12. The device setup support system as claimed in claim 11, wherein the step which is allowed according to the allowable condition is every step preceding the current step selected based on the sequence determined by said step output circuitry.

13. A system according to claim 11, wherein said step selection cicrcuitry comprises a memory map storing history information for a particular step that indicates whether said particular step has been reviewed.

14. A system according to claim 13, wherein said memory map includes a history entry for each step, and a link entry for each step, said link entry for each step including HTML link information for retrieving information pertaining to said each step.

15. A device setup support method for supporting operation of a user under guidance from an output unit when the user sets up a device in a predetermined state, said method comprising:

dividing the device setup into steps and determining a sequence of steps;

forming guidance data by storing image data so that the data can be retrieved corresponding to each of the setup steps;

referencing the step sequence and outputting a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed; and outputting the guidance data corresponding to the step selected through said step selection by the user in step units, wherein the guidance data is formed of files linked with each other.

16. A computer-readable recording medium storing a program for causing a computer to support operation of a user under guidance from an output unit when the user sets up a device in a predetermined state, comprising:

a step output sequence setting function for dividing the device setup into steps and determining a sequence of the steps;

a guidance data storage function for forming guidance for describing the steps, the guidance comprising image data, and for storing the data so that the data can be retrieved corresponding to each of the setup steps;

a step selection control function for referencing the step output sequence and controlling output of a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed; and a guidance output control function for controlling output of the guidance data corresponding to the step selected by the user, wherein the guidance is formed of files linked with each other, and wherein said step selection control function describes information linked with the guidance files corresponding to the next selectable steps in the guidance file corresponding to the current step selected.

17. The recording medium as claimed in claim 16, wherein the step which is allowed according to the allowable condition is every step preceding the current step selected based on said sequence.

18. A recording medium according to claim 16, wherein said program references a memory map storing history information for a particular step that indicates whether said particular step has been reviewed.

19. A recording medium according to claim 18, wherein said memory map includes a history entry for each step, and a link entry for each step, said link entry for each step including HTML link information for retrieving information pertaining to said each step.

20. A device setup support system for supporting operation of a user under guidance from an output unit when the user sets up a device in a predetermined state, said system comprising:

step output sequence setting circuitry programmed to divide the device setup into steps and set a list of a sequence of the steps;

guidance data storage device which forms guidance for describing the steps, the guidance comprising image data, and which stores the data so that the data can be retrieved corresponding to each of the setup steps;

step selection circuitry programmed to reference the step output sequence and output a step immediately following the current step selected and a step which is allowed according to an allowable condition as the next selectable steps so that the user can select one of the steps, said allowed steps being limited to certain previously selected steps to ensure that the user only views a step which is immediately following the current step or a step which the user has previously viewed, said selection circuitry utilizing a memory map storing history information for a particular step that indicates whether said particular step has been reviewed; and guidance output circuitry for outputting the guidance data corresponding to the step selected through said step selection circuitry by the user in step units.

* * * * *